Oct. 11, 1949.   J. J. PATERNO   2,484,726
TERMINAL PROTECTOR
Filed July 18, 1947

Inventor
Joseph J. Paterno
by Roberts, Cushman & Grover
att'ys.

Patented Oct. 11, 1949

2,484,726

UNITED STATES PATENT OFFICE 2,484,726

TERMINAL PROTECTOR

Joseph J. Paterno, Salem, Mass.

Application July 18, 1947, Serial No. 761,868

2 Claims. (Cl. 173—259)

In the art of storage battery terminals considerable difficulty has been experienced by the corrosion of terminals and battery connections caused by the acid in the battery leaking out of the battery casing around the terminal post, particularly in storage batteries which are subject to agitation and vibration, where the terminal post has a tendency to become loose, such as batteries used on an automobile.

The object of the present invention is to provide an improved sealing device for installation on the terminal post of any battery to prevent the acid from leaking out of the casing and causing the battery casing and clamping terminals to corrode. Devices have been designed to overcome the aforesaid difficulties, but none of these have been successful. The present invention provides a novel device not used heretofore that has proved successful and can be installed on the terminals of most batteries.

The aforesaid objects are achieved by means of a new and unique terminal protector incorporating therein a perforated web, said perforations being filled with oil and grease and held against the battery casing around the terminal post. The aforesaid perforations are supplied continually with oil and grease from the perforations in an intermediate washer located above said web.

For the purpose of illustration, a typical embodiment of the invention is shown in the accompanying drawings in which Fig. 1 is a side elevation of the terminal protector in section installed on the terminal post;

Figure 1:
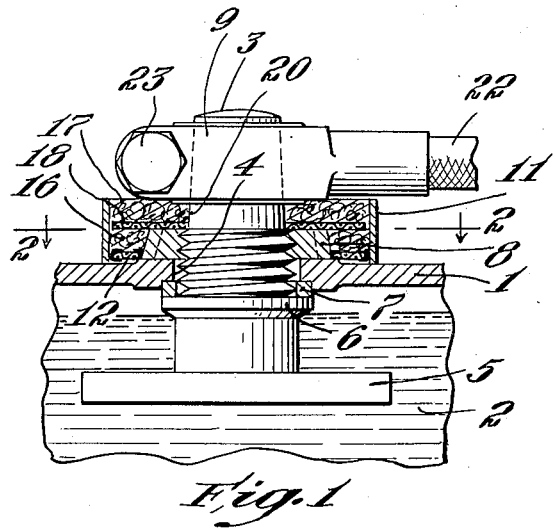

The storage battery chosen for purpose of illustration comprises a casing 1 adapted to contain an electrolyte 2. The terminal posts 3 extend from the electrolyte through holes 4 in the casing. A plate 5 is attached to the bottom of the terminal post 3 below the level of the electrolyte. The terminal post 3 has a shoulder 6 which compresses a circular gasket washer 7 against the casing 1 when the nut 8 is screwed on the post. The nut has a tendency to unscrew causing the terminal posts to become loose and allowing the electrolyte to seep past the post causing the outside of the casing and the terminals to corrode. If the battery is subject to agitation or the clamping terminals 9 must be removed and replaced frequently in order to recharge the battery this tendency is aggravated.

Figure 4:
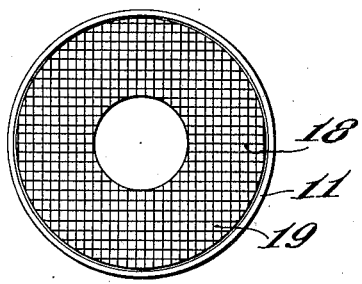
Fig. 4 is a top view of the terminal protector with the top washer removed.
Figure 2:
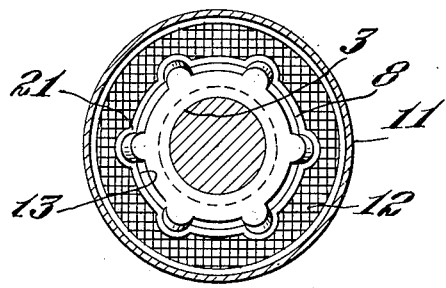
Fig. 2 is a section of the terminal protector on line 2—2 of Fig. 1.
Figure 5:
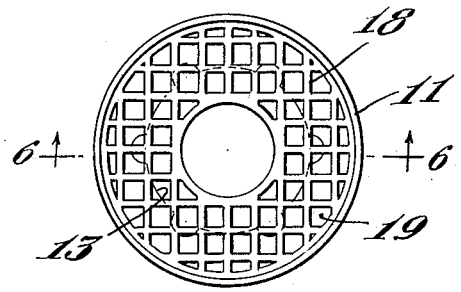
Fig. 5 is a top view of an alternative construction of the terminal protector with the top washer removed.
Figure 3:
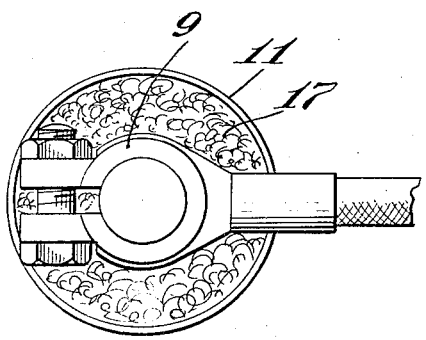
Fig. 3 is a top view of Fig. 1.
Figure 6:
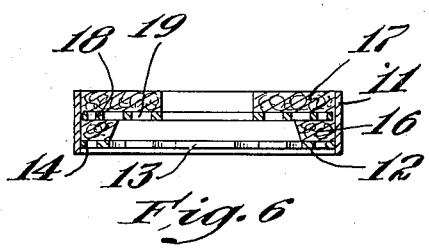
Fig. 6 is a section on line 6—6 of Fig. 5.

The terminal protector which is designed to overcome the aforesaid difficulties comprises a ring 11 made preferably of metal or plastic but any other suitable material may be used, with a perforated web or screen 12 attached across the lower edge, thereby forming a receptacle to hold oil, grease and the necessary washers. The web 12 must be attached to the ring 11 so that the receptacle will not move horizontally. If plastic material is used, it is preferable to form the ring and web in one piece. If the ring is metal, a wire screen may be soldered on the lower edge of the ring to form the web. The screen 12 has a central recess 13, as shown in Figs. 2 and 5, which is adapted to fit over the nut 8. A brace 21 is attached around the central recess 13 to strengthen it so that the screen web will not crumple and allow horizontal movement of the receptacle. The web contacts the casing and grease located in said perforations or recesses 14 of the web is held in contact with the casing. Two replaceable washers 16 and 17 of cardboard, felt or other similar material, soaked with oil or grease, are placed within the ring with an intermediate replaceable washer 18, between them, as shown in Figs. 1 and 6. The intermediate washer 18 and the web 12 can be made of a screen material, as shown in Fig. 4, or of plastic with a plurality of recesses 19, as shown in Fig. 5, or any other perforate material. The perforations or recesses 19 in the washer 18 hold a secondary supply of oil therein which soaks through the washer 16 to the perforations or recesses 14 in the web screen 12. The combination of two felt washers with an intermediate perforated washer as illustrated in Figs. 1 and 6 has been found to operate satisfactorily but it may be found that a rearrangement of the washers or a variation in the number may be found to be more efficient for the particular use and climate that the battery is subject to. Additional washers may be added from time to time or replaced as may be found necessary. The upper washer 17 and the intermediate washer 18 have central recesses 20 which fit over the terminal post 4. The lower washer 16 has a central recess which fits over the nut 8 and is of such a thickness that its top is approximately level with the top of the nut 8. The washers 16 and 17 before being installed within the ring are soaked in oil and grease. Each time that battery water is replenished a few drops of oil or a little grease should be placed on top of the washer 17. The oil soaks down through the washers to the perforations 19 in the intermediate washer and from this secondary storage recess it soaks down into the perforations 14 in the web. Thereby the perforations or recesses 14 in contact with the casing are always kept filled thus keeping the casing soaked.

The terminal protector, fits over the terminal post 4 and over the securing nut 8 said protector being held in place vertically by the clamping terminal 9 and horizontally by the web as aforesaid described. When the clamping terminal to which is attached the cable 22 is clamped onto the terminal post 4 by the bolt 23, the terminal protector is held down and the web is thereby held against the casing.

It should be understood that the present disclosure is for the purpose of illustration only and that this invention includes all modifications and equivalents which fall within the scope of the appended claims.

I claim:

1. A receptacle for holding anti-corrosion material to protect the post and casing of a battery, comprising a hollow body having a reticulated web closing the bottom thereof, said web having an aperture therein so that said body can be positioned circumjacent of said post, and a plurality of washers enclosed by said body and tightly encircling said post, alternate washers being of porous material saturated with anti-corrosion material, the remaining washers being reticulated whereby the anti-corrosion material gradually passes through the web thereby to protect the battery.

2. A receptacle for holding grease to protect the post and casing of a battery comprising a hollow cylindrical body having a reticulated web closing the bottom thereof, said web having a centrally-located aperture therein so that said body can be positioned circumjacent said post, and a plurality of circular washers enclosed within said body and tightly encircling said post, alternate washers being of porous material saturated with grease, the remaining washers being reticulated, whereby the grease passes through the web thereby to protect the battery.

JOSEPH J. PATERNO.

REFERENCES CITED

The following references are of record in the file of this patent:

UNITED STATES PATENTS

| Number | Name | Date |
|---|---|---|
| 1,938,010 | Davies | Dec. 5, 1933 |
| 2,237,630 | Paterno | Apr. 8, 1941 |
| 2,246,060 | Newhouse | June 17, 1941 |